J. W. Gillespie.
Eaves Trough Bracket.
Nº 88,626.   Patented Apr. 6, 1869.
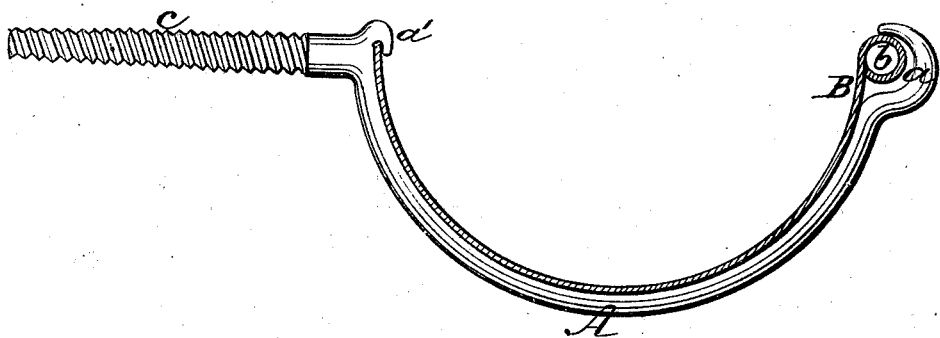
Witnesses.
Chas A Brown.
C. W. Werden.
Inventor.
J. W. Gillespie.
per Geo. E. Brown
Atty

United States Patent Office.

JOSEPH W. GILLESPIE, OF ALLIANCE, OHIO.

Letters Patent No. 88,626, dated April 6, 1869.

IMPROVED EAVES-TROUGH BRACKET.

The Schedule referred to in these Letters Patent and making part of the same.

*To all whom it may concern:*

Be it known that I, JOSEPH W. GILLESPIE, of Alliance, in the State of Ohio, have invented a new and useful Improvement in Eaves-Trough Brackets; and I do hereby declare that the following is a full, clear, and exact description of the same, reference being had to the accompanying drawings and letters of reference marked thereon, making a part of this specification, in which—

Figure 1 is a side elevation.

This invention consists in providing an eaves-trough bracket with a recess at the front end to receive the bead of the trough, and with a lip or hook at the rear end to hold the back edge of the trough, and with a screw projecting from the rear end of the bracket, and cast solid therewith, for purposes of attachment.

To enable those skilled in the art to make and use my invention, I now proceed to describe its construction and operation.

Similar letters in the drawings refer to like parts.

In the drawings—

A represents an eaves-trough bracket of cast-iron, provided at its front end with a recess, $a$, of suitable dimensions to receive the bead $b$ of the trough B, and provided at its rear end with a hook, $a'$, to hold the back edge of the trough. When the trough is placed in these brackets the back edge is first introduced under the hook $b$, and then the bead $b'$ sprung into the recess $a$. These two devices serve to hold the trough firmly in place without any other fastening, the trough being made a little wider than the distance between $a$ and $a'$, so that its own elasticity may keep it in place. At the same time, the bead may be sprung out of the recess $a$ on the application of sufficient force.

I am aware that the patent of W. Yapp, August 15, 1865, exhibits certain devices which the foregoing considerably resemble. I have therefore added to them an improving feature not shown in Yapp's patent, viz, the screw $c$ cast solid with the bracket. This part makes the whole article complete in itself, thus avoiding the inconvenience consequent upon the loss of a separate screw. It furthermore diminishes the cost of manufacture, as in any case there must be a screw, and if it be not cast with the bracket, a socket, like Yapp's, must be provided for it at additional expense.

What I claim as new, and desire to secure by Letters Patent, is—

The bracket A, provided with the recess $a$, the hook $a'$, and the screw $c$, cast solid with it, substantially as described.

JOS. W. GILLESPIE.

Witnesses:
M. R. SHALTERS,
SAMUEL RAY.